United States Patent

Chang et al.

[19]

[11] Patent Number: 5,974,196

[45] Date of Patent: *Oct. 26, 1999

[54] METHOD AND APPARATUS FOR BLOCKING EFFECT REDUCTION IN IMAGES

[75] Inventors: Ching-Fang Chang, San Jose; Chuen-Chien Lee, Fremont, both of Calif.

[73] Assignees: Sony Corporation, Tokyo, Japan; Sony Electronics, Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/616,559

[22] Filed: Mar. 15, 1996

[51] Int. Cl.⁶ .................................................. G06K 9/40
[52] U.S. Cl. ............................ 382/268; 382/254; 358/433
[58] Field of Search .................................. 382/268, 266, 382/269, 254, 248, 250, 251; 358/432, 433

[56] References Cited

U.S. PATENT DOCUMENTS

| | | |
|---|---|---|
| 4,805,129 | 2/1989 | David . |
| 4,910,594 | 3/1990 | Kondo . |
| 5,023,710 | 6/1991 | Kondo et al. . |
| 5,049,990 | 9/1991 | Kondo et al. . |
| 5,070,403 | 12/1991 | Wilkinson . |
| 5,109,451 | 4/1992 | Aono et al. ................................ 382/56 |
| 5,142,537 | 8/1992 | Kutner et al. . |
| 5,220,616 | 6/1993 | Downing et al. ......................... 358/448 |
| 5,272,536 | 12/1993 | Sudo et al. . |
| 5,335,019 | 8/1994 | Herz et al. . |
| 5,337,088 | 8/1994 | Honjo ....................................... 348/420 |
| 5,351,083 | 9/1994 | Tsukagoshi . |
| 5,381,354 | 1/1995 | Soloff . |
| 5,422,964 | 6/1995 | Devimeux et al. ...................... 358/433 |
| 5,450,506 | 9/1995 | Gillard et al. ........................... 382/309 |
| 5,537,493 | 7/1996 | Wilkinson ............................... 382/240 |
| 5,590,064 | 12/1996 | Astle .................................... 364/715.02 |

FOREIGN PATENT DOCUMENTS

| | | |
|---|---|---|
| 571171A2 | 5/1993 | European Pat. Off. . |
| 590922A2 | 9/1993 | European Pat. Off. . |
| 680217A2 | 4/1995 | European Pat. Off. . |
| 680219A2 | 5/1995 | European Pat. Off. . |
| 4128977A | 8/1991 | Netherlands . |
| 2287153A | 9/1995 | United Kingdom . |
| 9119271 | 12/1991 | WIPO . |

OTHER PUBLICATIONS

Patent Abstracts of Japan, Publication No. 05219493, Aug. 27, 1993, "Picture Information Restoring Device," 1 page.

Patent Abstracts of Japan, Publication No. 04342372, Nov. 27, 1992, "Image Data Compressor," 1 page.

Patent Abstracts of Japan, Publication No. 05110868, Apr. 30, 1993, "Visual Characteristic Region Conversion System," 1 page.

(List continued on next page.)

*Primary Examiner*—Thomas D Lee
*Attorney, Agent, or Firm*—Blakely, Sokoloff, Taylor & Zafman LLP

[57] ABSTRACT

An apparatus and method for post processing image data which previously was encoded using a discrete cosine transform in order to remove resulting blocking effects. Possible blocking points are examined to determine whether blocking points exist. If blocking points are determined, an adjustment value for each blocking point is computed and proportionately utilized to adjust the adjacent and neighboring pixels.

21 Claims, 6 Drawing Sheets

OTHER PUBLICATIONS

International Search Report Dated Jun. 10, 1997 for PCT Patent No. PCT/US97/00499 filed Jan. 10, 1997.

International Search Report Dated Jun. 10, 1997 for PCT Patent Application No. PCT/US97/00737 filed Jan. 10, 1997.

International Search Report Dated Jun. 30, 1997 for PCT Patent Application No. PCT/US97/03292 filed Mar. 3, 1997.

Avideh Zakhor, "Iterative Procedures for Reduction of Blocking Effects in Transform Image Coding", Jun. 10, 1991, pp. 91–95.

International Telecommunication Union, "Line Transmission of Non–Telephone Signals", Mar. 1993, pp. 1–25.

"An Adaptive Image Quality Improvement Method for DCT Coding Schemes," *PCS '93 1993 Picture Coding Symposium Proceedings,* Mar. 17–19, 1993, Swiss Federal Institute of Technology, Lausanne—Switzerland, 3 pages.

Patent Abstracts of Japan, Publication No. 07087500, Mar. 31, 1995, "Method for Post–Processing for Decoded Picture Signal," 1 page.

Ken Sauer, "Enhancement of Low Bit–Rate Coded Images Using Edge Detection and Estimation," *Graphical Models and Image Processing,* Jan. 1991, vol. 53, No. 1, pp. 52–62.

METHOD AND APPARATUS FOR BLOCKING EFFECT REDUCTION IN IMAGES

BACKGROUND OF THE INVENTION

1. Field of the Invention

The present invention relates to the removal of blocking effects in images previously compressed and decompressed. More particularly, the present invention relates to the removal of blocking effects in images compressed in accordance with MPEG, JPEG and other DCT based image coding formats.

2. Art Background

The need to compress digital image data, whether static or dynamic (i.e., video images) images has dramatically increased. One reason is the dramatic popularity of multimedia computer systems and software. Another reason is switch to digital broadcasts of station programming. One example of the latter is direct satellite broadcasts, such as DSS™. In order to minimize the bandwidth required to transmit broadcasts of programs or to minimize the amount of storage space required to store certain images, compression techniques are utilized. Thus, the image data is transmitted or stored in a compressed format and prior to the display of the image, the image data is decompressed. Examples of widely utilized compression algorithms are those that comply with the MPEG (Moving Pictures Experts Group) and JPEG (Joint Picture Experts Group) standards.

Many compression processes, including those that comply with MPEG or JPEG standards, utilize transform coding. In a transform coding process, an image is divided into small blocks. The transform of each block is taken, the coefficients of which are quantized in accordance with a determined quantization factor q. The most popular transform is the discrete cosine transform (DCT).

However, one negative effect of the process is referred to as the "blocking effect". By dividing the image into blocks prior to encoding, discontinuities (referred to as blocking effects) between adjacent blocks occurs. This is represented in a displayed decompressed image by clear jumps between colors or greyscales as opposed to a smooth change.

Pre-processing and post-processing techniques are utilized to minimize blocking effects. Pre-processing techniques dictate that the originator of the image data must perform certain steps to minimize blocking effects. Post-processing techniques, although logistically better as the correction is performed after decompression, has its problems. For example, one of the simplest techniques is to process the decompressed image data through a low pass filter. Although the blocking effects are decreased, the sharpness of the displayed image is negatively affected.

SUMMARY OF THE INVENTION

In the method and circuit of the present invention post processing is performed on decompressed image data to detect and minimize blocking effects without affecting the sharpness of the image.

First pixels subject to blocking errors are detected. Preferably the difference in pixel values (e.g., luminance) between neighboring pixels is examined to determine whether the difference value is within a range identified to be a blocking errors. Once a blocking error is detected, adjustment terms are added to the pixels detected and neighboring pixels in the image. The amount of adjustment is proportional to the number of pixels away from where blocking has been detected. The resulting image exhibits minimal blocking effects while maintaining a consistent sharp image.

BRIEF DESCRIPTION OF THE DRAWINGS

The objects, features and advantages of the present invention will be apparent to one skilled in the art in light of the following detailed description in which.

DETAILED DESCRIPTION

The present invention provides a simple but effective apparatus and method for minimizing blocking effects that occur in discrete transformed images. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
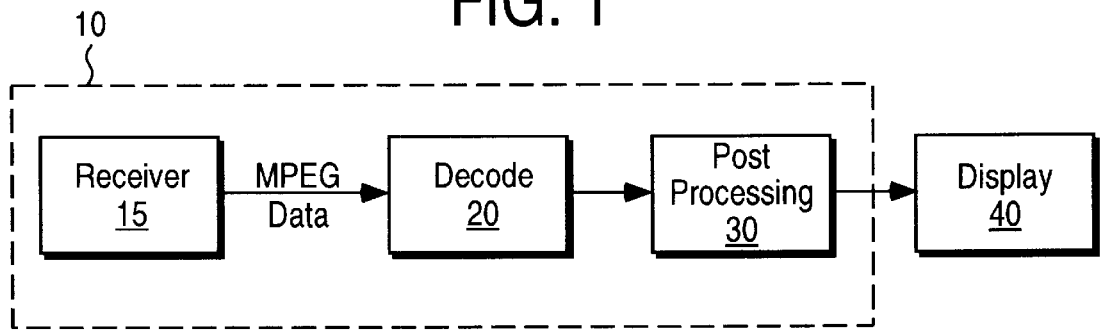
FIG. 1 is a simplified block diagram of a system that operates in accordance with the teachings of the present invention.

A simplified block diagram of an exemplary system that operates in accordance with the teachings of the present invention is illustrated in FIG. 1. To minimize on transmission bandwidth and/or to save on the amount of space required to store an image, the image is frequently formatted in a compressed form which utilizes discrete transforms. Popular examples of formats include those that comply with the JPEG Joint Picture Experts Group) and MPEG (Motion Picture Experts Group) standards. The system illustrated includes the receiver/display system 10 and display 40. One example of a receiver/display system 10 is a Video CD player. Another example is a direct satellite receiver such as one manufactured by Sony Corporation. Other types of receivers/players/storage/display systems are also contemplated.

The receiver 10 receives the compressed image. The receiver may be one of many types of receiving devices configured to receive image data. Alternately, the receiver may be one to receive television broadcast signals or a device coupled to directly to a storage unit (e.g., memory, VCR, CD ROM or the like) to receive images retrieved from storage. For purposes of explanation, the image data is received in a format compatible with the MPEG specification; however, the other types of compressed formats that use discrete transforms to compress the data can also be used.

Once the image data is received, the data is decoded on a block by block basis (i.e., decompressed) by decoder 20 and processed by post-processor 30 in order to remove blocking effects created by the encoding and decoding processes. The modified image data subsequently displayed by display subsystem 40 shows an image in which the blocking effects are minimized.

Figure 2:
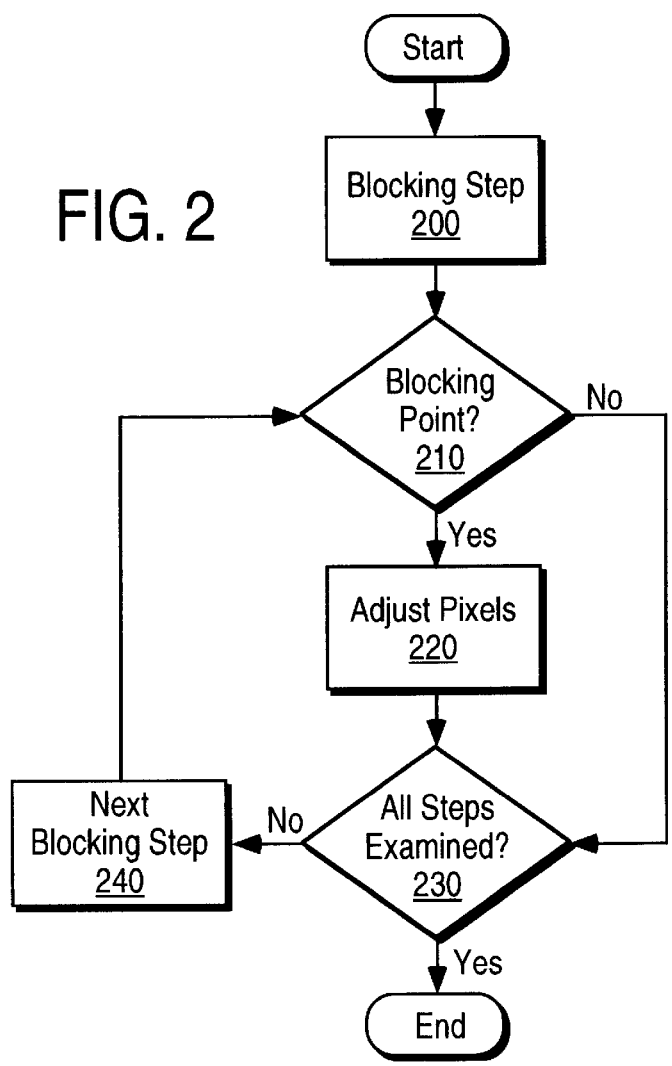
FIG. 2 is a simplified flow diagram depicting the process for minimizing blocking effects.

The process performed by post-processor 30 is generally described with reference to FIG. 2. In the present invention, the adjacent pixels at each boundary point around the block are examined to determine if a blocking point exists between the pixels, step 200. If a blocking point is identified, an adjustment value is determined and applied to the pixels, step 220. This adjustment value is applied to the adjacent and neighboring pixels in a graduated or manner proportional to the distance from the blocking point. By adjusting not only the adjacent pixels, but also the neighboring pixels, the adjustment result in a smoother image in the areas surrounding block boundaries.

Figure 3:
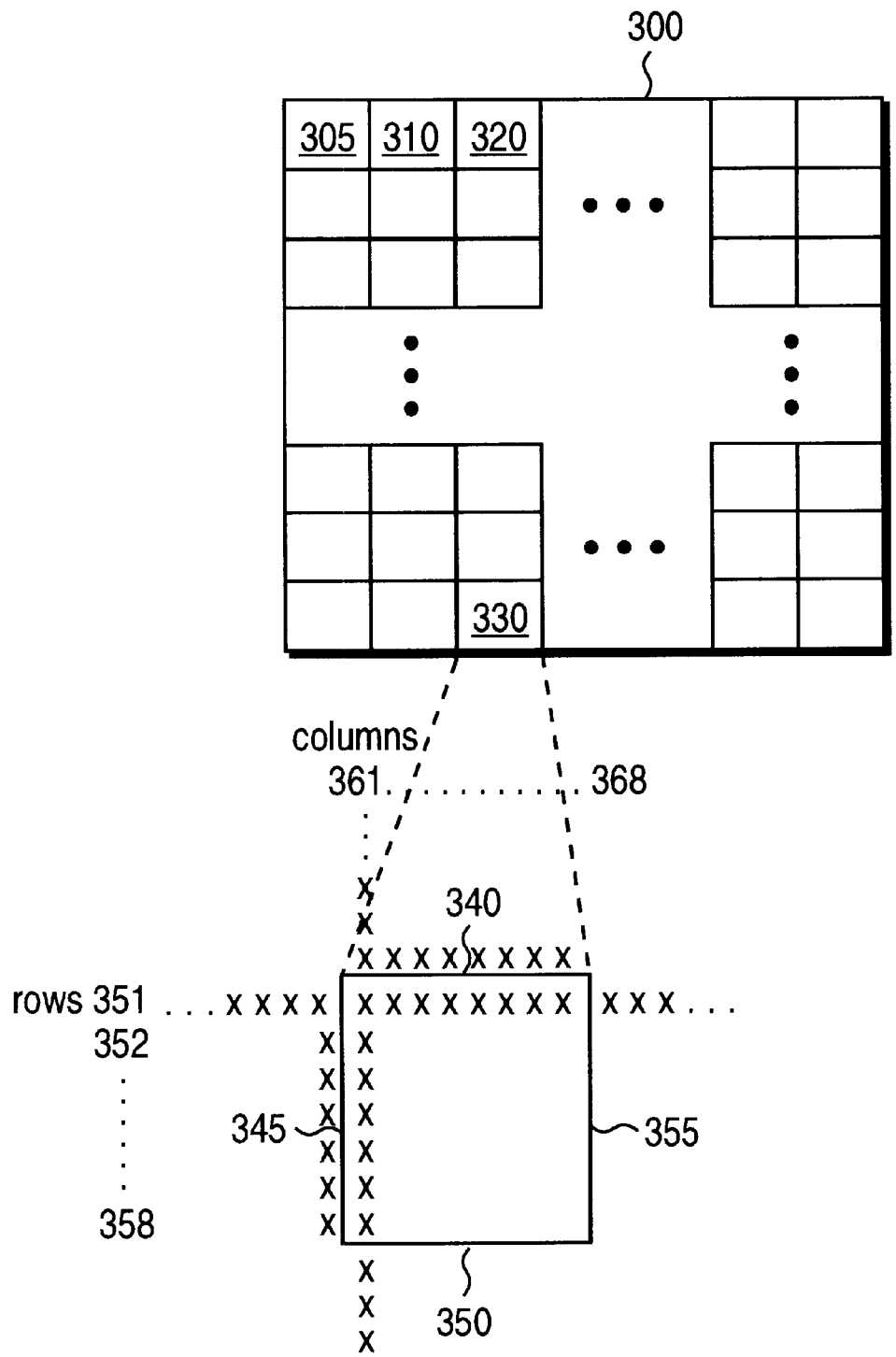
FIG. 3 is a diagram illustrating blocks and block boundaries in a digital image.

The detection process can be applied to each pair of adjacent pixels in the image, for example on a column by column or row by row basis. Preferably, to minimize processing time, while maintaining effectiveness, the pixels adjacent to block boundaries are examined. This is best illustrated with reference to FIG. 3. As noted earlier, the image 300 is divided into blocks (e.g., blocks 305, 310, 320, 330) and the DCT and quantization process are applied to each block of pixels. The blocking effects occur at the blocking boundaries (e.g., block boundaries 340, 345, 350, 355 of block 330). For example, if a vertical boundary 345 is examined, the pixels in the rows affected, the adjacent pixels on both sides of the blocking boundary in rows 351–358 are examined to determine if a blocking point exists and the adjustments are performed on the adjacent and predetermined neighboring pixels in the corresponding row. Similarly, if a horizontal boundary 340 is examined, the adjacent pixels in the columns 361–368 are examined to determine the existence of blocking points and the adjacent and neighboring pixels in those columns are adjusted.

Figure 4:
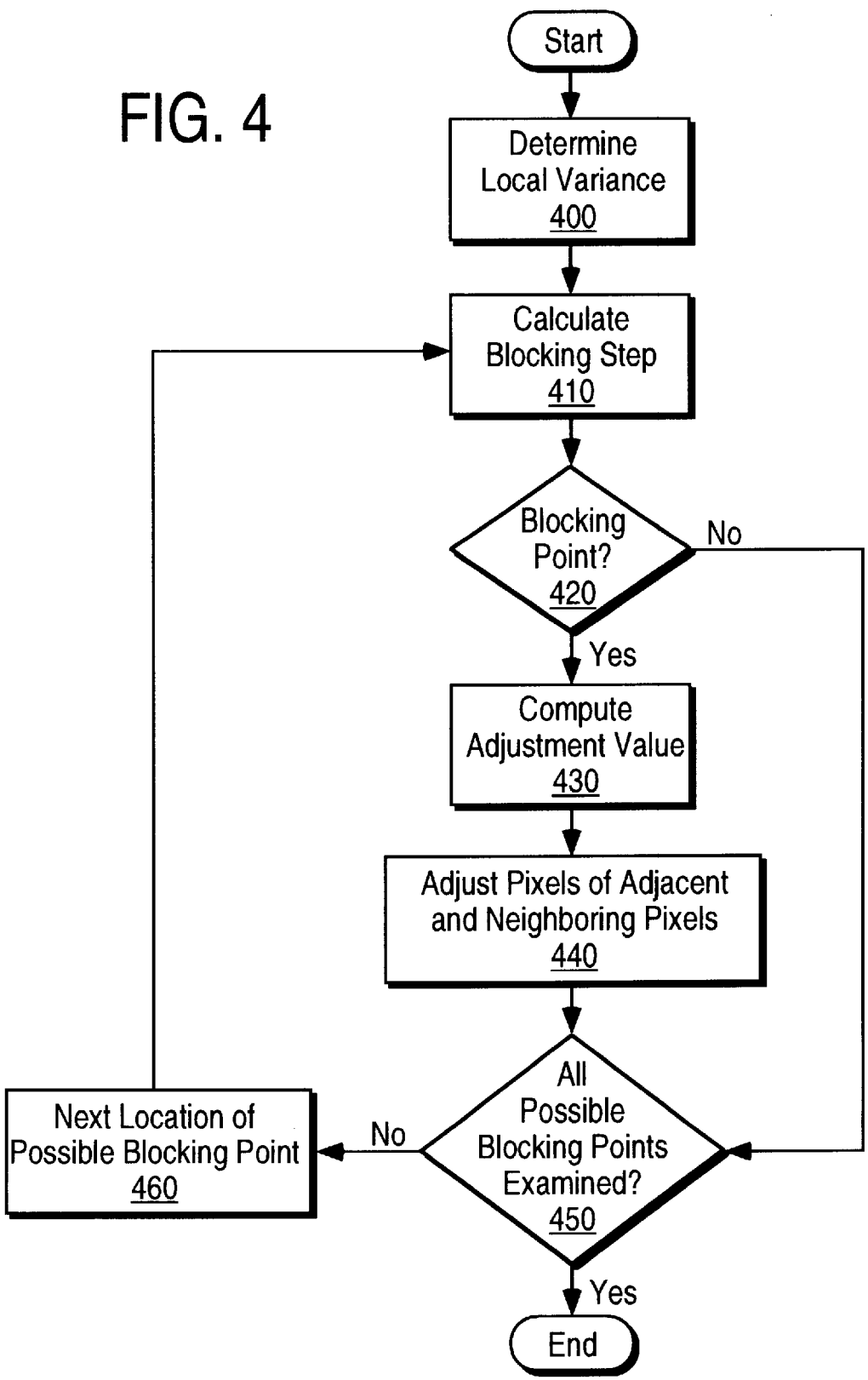
FIG. 4 is a flow diagram illustrating one embodiment process to be performed on a block by block basis.

One embodiment of the process for detecting and minimizing blocking effects is described with reference to FIG. 4. As noted earlier, the difference between adjacent pixels (blocking step) at each block boundary is compared to a pre-specified range of values indicative of a boundary point.

The upper and lower limits of the range of values indicative of a blocking point can be determined a variety of ways. Preferably the upper and lower limits are selected such that normal minor image variations between pixels are not detected as blocking points and significant image variations, for example indicative of different objects in the image itself, are not detected as blocking points. The upper and lower limits can be pre-specified values empirically determined. Other ways for determining the upper and lower limits are also contemplated. For example, the values can be dynamically determined. However, it is preferred that the lower limit value be the local variance for the neighborhood of pixels.

At step 400, the local variance of the neighborhood around the block is determined. Preferably, the local variance is determined for each potential location of a blocking point. The size of the neighborhood (i.e., the number of pixels) and the location of the pixels examined can vary. In the present example, if a vertical boundary is examined, the portion of a row utilized to determine a particular potential vertical boundary point contains the following pixels:

x+4 x+5 x+6 x+7 | x+8 x+9 x+10 x+11

(where | represents the location of the boundary point)

The local variance of a neighborhood of pixels can be defined a variety of ways. In the present embodiment the local variance is determined as the average of the summation of the absolute values of the difference between luminance values of adjacent pixels of neighborhood used. In the present example, the neighborhood is composed of 6 pixels (i+5, i+6, i+7, i+8, i+9, i+10); therefore the following equation is used:

local variance=$abs\ (p[i+6][\ ]-p[i+5][\ ])+abs\ (p[i+7][\ ]-p[i+6][\ ])+abs\ (p[i+9][\ ]-p[i+8][\ ])+abs(p[i+10][\ ]-p[i+9][\ ])/4$ where abs represents an absolute value function and p[ ][ ] represents pixel data.

The upper limit value of can similarly be determined a variety of ways. However, in the present embodiment a predetermined, empirically determined value is used. This value is chosen to reflect a possible error that is larger than an error that can be caused by the quantizing of the block during the coding process. For example in the present embodiment a value of 32 is used.

Once the local variance is determined and therefore the range of values indicative of a blocking point are identified, the blocking step between pixels adjacent to the block boundary is determined, step 410. Continuing with the above example, the difference between pixels x+7 and x+8 is determined. Preferably, the difference value is composed of the difference between the luminance components in each pixel, although other components of the image data can be used.

At step 420, the blocking step is compared to the range of values to determine whether a blocking point exists. If a blocking point exists, the adjustment value is determined, step 430.

The adjustment value can be determined a variety of ways. The value is chosen to minimize or eliminate the detected blocking point. Preferably, the adjustment value is determined such that the step on the blocking point (i.e., at the blocking point) will be adjusted to the local variance in the corresponding region or neighborhood. Continuing with the present example, if the blocking step is greater than zero, the adjustment value is equal to the difference of the blocking step and the local variance (adjustment_value= blocking_step−local variance); otherwise the adjustment value is equal to the sum of the blocking step and local variance (adjustment_value=blocking_step+local_ variance).

Once the adjustment value is determined it is added to the appropriate pixels to minimize or eliminate the blocking effect. Preferably proportionate amounts of the adjustment value is added to the pixels adjacent to the detected blocking point and neighboring pixels. The number of neighboring pixels and the proportionate amounts added can vary. However, it is preferred that the following pixels and proportionate amounts of the adjustment value be used to minimize the blocking effect:

p'[i+8][ ]=p[i+8][ ]−adjustment_value/2
p'[i+7][ ]=p[i+7][ ]+adjustment_value/2
p'[i+9][ ]=p[i+9][ ]−adjustment_value/4
p'[i+6][ ]=p[i+6][ ]+adjustment_value/4
p'[i+10][ ]=p[i+10][ ]−adjustment_value/8
p'[i+5][ ]=p[i+5][ ]+adjustment_value/8
p'[i+11][ ]=p[i+11][ ]−adjustment_value/16
p'[i+4][ ]=p[i+4][ ]+adjustment_value/16

As can be seen by the above, the present example adjusts the two adjacent pixels and six neighboring pixels. The fraction of the adjustment value added is proportionate to the distance from the blocking point. To simplify the circuitry used to implement this functionality, fractional amounts corresponding to powers of 2 are used. However it is readily apparent that other fractional amounts and percentages can be used to gain the desired effect.

Figure 5A:
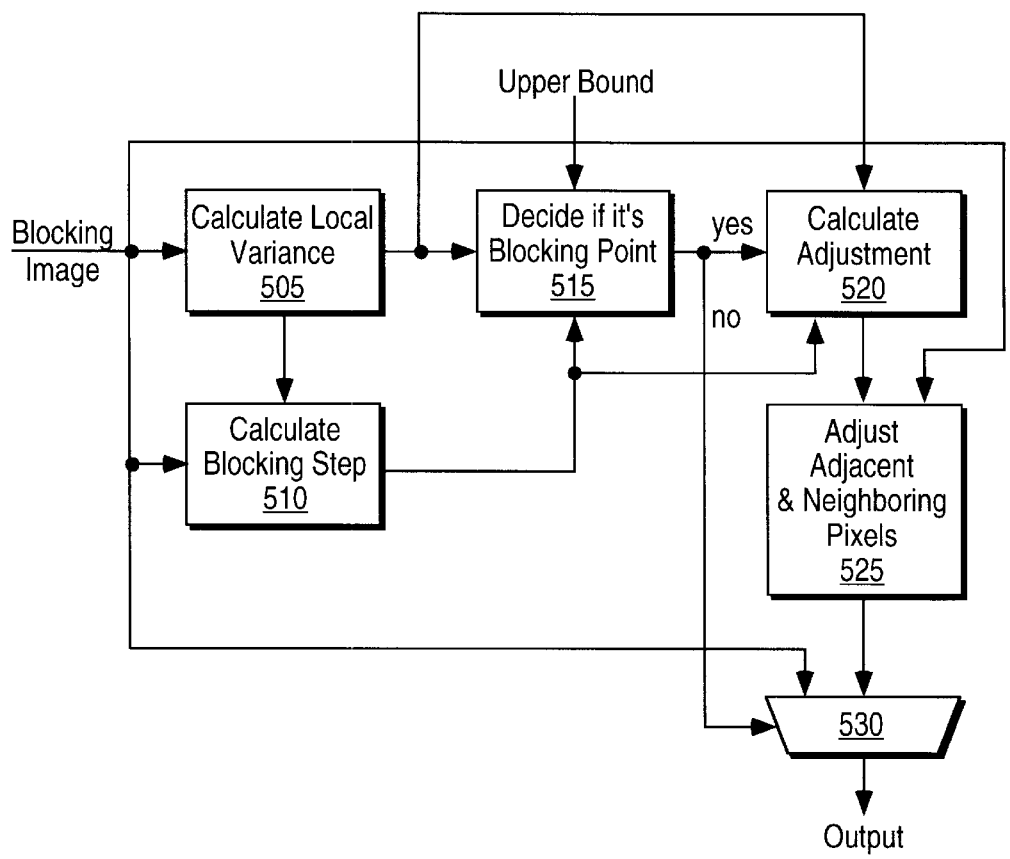
FIG. 5a is a simplified block diagram of a circuit that performs a process for minimizing blocking effects.

A circuit implementation is illustrated by the block diagram of FIG. 5a. FIG. 5a represents one implementation; it is readily apparent that the present invention can be implemented in a dedicated microcontroller circuit, in logic circuitry or as software operable on a general purpose computer. Referring to FIG. 5a, the blocking image is input to local variance block 505 and calculation of blocking step block 510. The local variance block determines the local variance for use as a lower threshold as described above. Block 510 calculates the blocking step using the blocking image as input. Block 515 determines, using the blocking step, local variance and upper bound as inputs, whether a blocking point occurs. If a blocking point occurs, blocks 520, 525 calculate the adjustment, using the blocking image and identification of the blocking point as inputs and adjusts the neighboring pixels accordingly to generate the adjusted image through multiplexing block 530. If a blocking point does not occur, the original image (blocking image) is output.

Figure 5B:
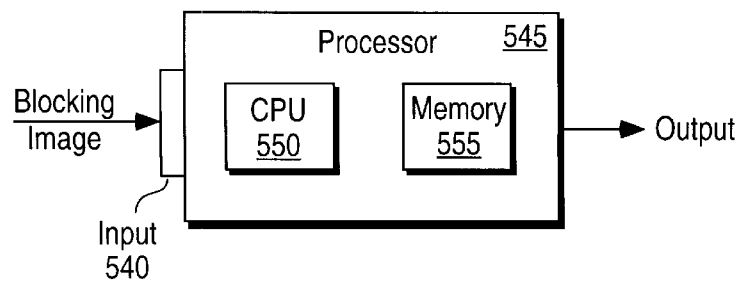
FIG. 5b is a simplified block diagram of an illustrative processor system which performs the steps to reduce blocking effects in accordance with the teachings of the present invention.

A simplified block diagram of a processor system upon which this can be implemented is illustrated in FIG. 5b. The blocking image is received through input port circuitry 540 which forwards the blocking image to processor 545. Processor 545 includes a central processing unit 550 which executes instructions from the memory 555 to perform the steps described above to reduce blocking effects.

Figure 6A:
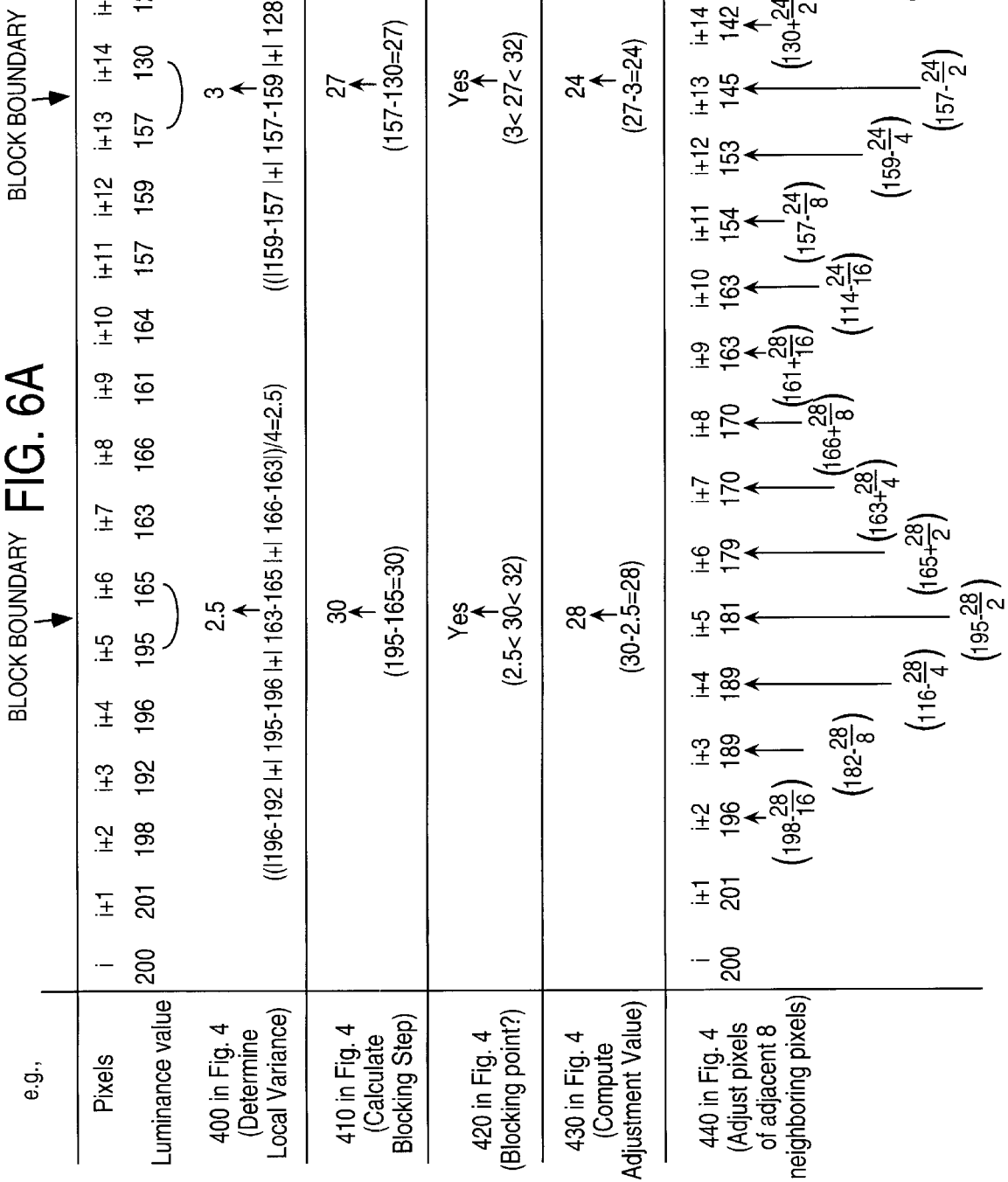
FIG. 6a and FIG. 6b illustrate the process for a single row accross a single boundary and the result achieved.
Figure 6B:
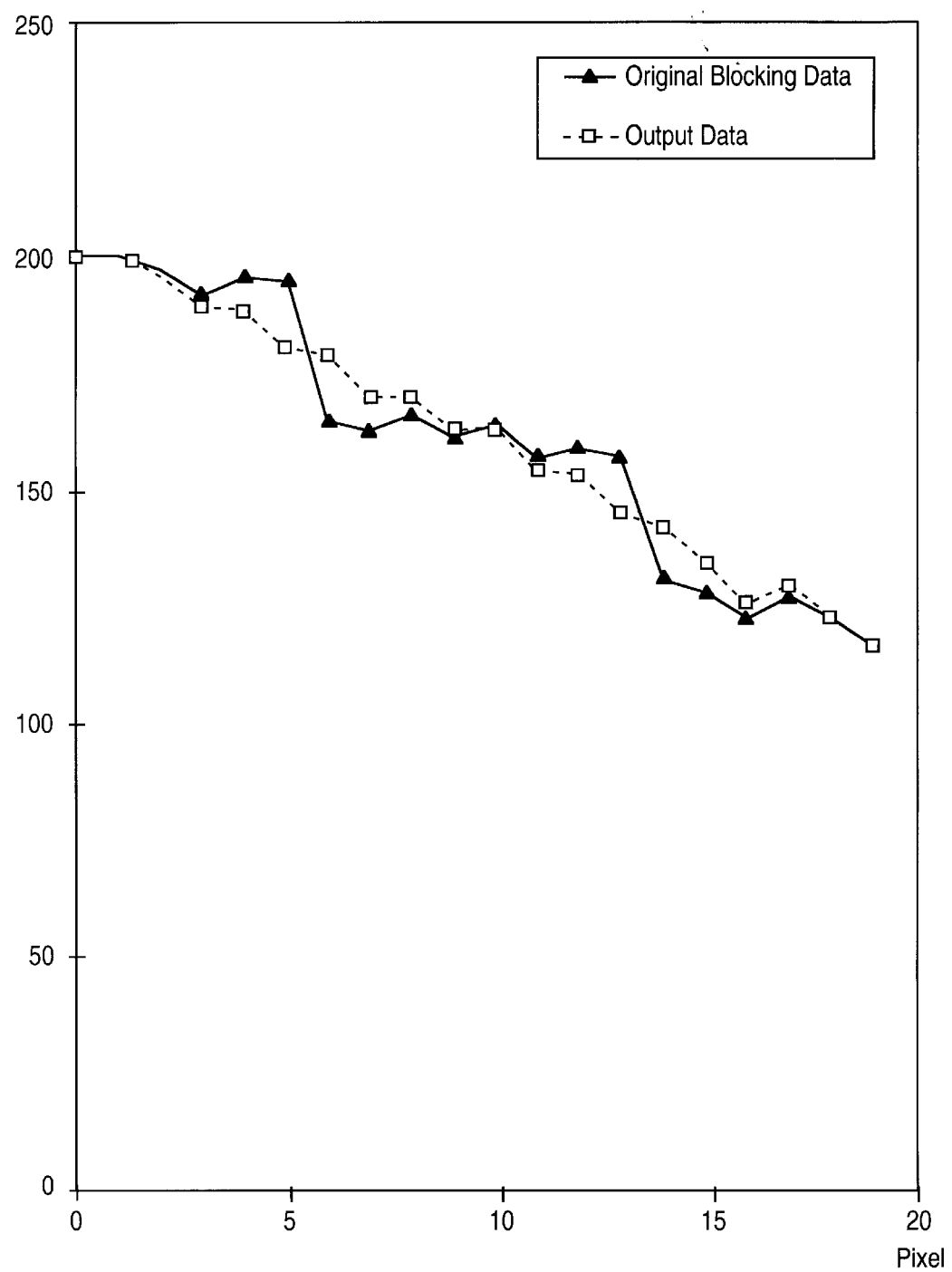

The advantages of the present invention are readily seen by the following example set forth in FIGS. 6a and 6b which illustrate the process for a single row across a block boundary. The process is preferably performed for each row and column affected by the block boundaries.

The invention has been described in conjunction with the preferred embodiment. It is evident that numerous alternatives, modifications, variations and uses will be apparent to those skilled in the art in light of the foregoing description.

What is claimed is:

1. A method for minimizing blocking effects in a blocking image caused by prior performance of a discrete cosine transform (DCT) and quantization process, said blocking image described by blocking image data comprising blocks of pixel data, said method comprising the steps of:
   determining whether at least one blocking point occurs respectively at boundary points of a block based upon a pre-specified range of values indicative of a blocking point;
   if at least one blocking point is identified; and
   for each blocking point identified;
      determining an adjustment value based upon a blocking step and local variance; and
      adjusting blocking data corresponding to pixel locations adjacent to the blocking point and neighboring pixels to the adjacent pixels.

2. The method as set forth in claim 1, wherein boundary points comprise vertical boundary points and horizontal boundary points and the step of determining whether at least one blocking point occurs comprises the steps of:
   for each vertical boundary point examined;
      generating the difference between pixel data between pixels horizontally adjacent to the vertical boundary point,
      comparing the difference to the pre-specified range of values indicative of a blocking point, and
      identifying a blocking point if the difference is within the pre-specified range of values; and
   for each horizontal boundary point examined;
      generating the difference between pixel data between pixels vertically adjacent to the horizontal boundary point,
      comparing the difference to the pre-specified range of values, and
      identifying a blocking point if the difference is within the pre-specified range of values.

3. The method as set forth in claim 1, wherein the pre-specified range of values indicative of a blocking point comprises an upper and lower limit, said upper and lower limits selected such that normal minor image variation between pixels are not detected as blocking points and significant image variations are not detected as blocking points.

4. The method as set forth in claim 1, wherein the pre-specified range of values indicative of a blocking point comprises an upper limit and lower limit, said lower limit comprising the local variance of neighborhood pixels to the blocking point.

5. The method as set forth in claim 4, wherein the local variance of neighborhood pixels is determined by averaging a summation of absolute values of a neighborhood of pixels about the blocking point.

6. The method as set forth in claim 1, wherein the pre-specified range of values indicative of a blocking point comprises an upper limit and lower limit, said upper limit comprising an empirically determined value chosen to reflect an error larger than an error that can be caused by quantization of the block during the quantization process.

7. The method as set forth in claim 1, wherein the step of determining an adjustment value comprises the step of generating the adjustment value such that the difference between pixel data of pixels adjacent to the blocking point is adjusted to a local variance of a neighborhood of pixels about the blocking point.

8. The method as set forth in claim 1, wherein the step of determining the adjustment value comprises the steps of:
   if a first difference between pixel values of pixels adjacent to the blocking point is greater than zero, computing the adjustment value to be a second difference between the first difference and a local variance, wherein the local variance of neighborhood pixels is determined by averaging a summation of absolute values of a neighborhood of pixels about the blocking point; and
   if the first difference is less than or equal to zero, computing the adjustment value to be a sum of the first difference and the local variance.

9. The method as set forth in claim 1, wherein the step of adjusting comprises adjusting adjacent and neighboring pixels by proportionate amounts of the adjustment value.

10. The method as set forth in claim 1, wherein the step of adjusting comprises the step of adjusting adjacent and neighboring pixels by proportionate amounts of the adjustment value proportionate to a distance each pixel of the adjacent and neighboring pixel is from the blocking point.

11. An apparatus for minimizing blocking effects in a blocking image caused by prior performance of a discrete cosine transform (DCT) and quantization process, said blocking image described by blocking image data comprising blocks of pixel data, said apparatus comprising:
   an input device for receiving blocking image data;
   a processor coupled to the input device, said processor comprising a central processing unit and memory, said processor determining whether at least one blocking point occurs respectively at boundary points of a block based upon a pre-specified range of values indicative of a blocking point; and if at least one blocking point is determined, for each blocking point identified, determining an adjustment value based upon a blocking step and local variance and adjusting pixel data corresponding to pixel locations adjacent to the blocking point and neighboring pixels to the adjacent pixels.

12. The apparatus as set forth in claim 11, further comprising a display device coupled to the processor to display pixel data output by the processor.

13. The apparatus as set forth in claim 11, wherein boundary points comprise vertical boundary points and horizontal boundary points and the processor determines whether at least one blocking point occurs by examining each vertical boundary point by generating the difference between pixel data between pixels horizontally adjacent to the vertical boundary point, comparing the difference to the pre-specified range of values indicative of a blocking point, and identifying a blocking point if the difference is within the pre-specified range of values; and examining each horizontal boundary point and generating the difference between pixel data between pixels vertically adjacent to the horizontal boundary point, comparing the difference to the pre-specified range of values, and identifying a blocking point if the difference is within the pre-specified range of values.

14. The apparatus as set forth in claim 11, wherein the pre-specified range of values indicative of a blocking point comprises an upper and lower limit, said upper and lower limits selected such that normal minor image variation between pixels are not detected as blocking points and significant image variations are not detected as blocking points.

15. The apparatus as set forth in claim 11, wherein the pre-specified range of values indicative of a blocking point comprises an upper limit and lower limit, said lower limit comprising the local variance of neighborhood pixels to the blocking point.

16. The apparatus as set forth in claim 15, wherein said processor determines the local variance of neighborhood pixels by averaging a summation of absolute values of a neighborhood of pixels about the blocking point.

17. The apparatus as set forth in claim 11, wherein the pre-specified range of values indicative of a blocking point comprises an upper limit and lower limit, said upper limit comprising an empirically determined value chosen to reflect an error larger than an error that can be caused by quantization of the block during the quantization process.

18. The apparatus as set forth in claim 11, wherein the processor determines the adjustment value such that the difference between pixel data of pixels adjacent to the blocking point is adjusted to a local variance of a neighborhood of pixels about the blocking point.

19. The apparatus as set forth in claim 11, wherein the processor determines the adjustment value to be a second difference between the first difference and a local variance if a first difference between pixel values of pixels adjacent to the blocking point is greater than zero, and determines the adjustment value to be a sum of the first difference and the local variance if the first difference is less than or equal to zero, wherein the local variance of neighborhood pixels is determined by averaging a summation of absolute values of a neighborhood of pixels about the blocking point.

20. The apparatus as set forth in claim 11, wherein the processor adjusts adjacent and neighboring pixels by proportionate amounts of the adjustment value.

21. The apparatus as set forth in claim 11, wherein the processor adjusts adjacent and neighboring pixels by proportionate amounts of the adjustment value proportionate to a distance each pixel of the adjacent and neighboring pixel is from the blocking point.

* * * * *